United States Patent

Daul

[11] Patent Number: 5,572,768
[45] Date of Patent: Nov. 12, 1996

[54] DOOR CLOSER

[75] Inventor: Terrance E. Daul, Hamburg, N.Y.

[73] Assignee: Enidine Incorporated, Orchard Park, N.Y.

[21] Appl. No.: 226,812

[22] Filed: Apr. 13, 1994

[51] Int. Cl.⁶ .......................... E05C 17/64; E05D 11/08; E05F 3/16; E05F 3/20
[52] U.S. Cl. .................. 16/49; 16/75; 16/50; 16/337; 16/338; 16/341
[58] Field of Search .................. 16/50, 278, 298, 16/299, 301, 338, 339, 75, 76, 337, 341, 340, 49

[56] References Cited

U.S. PATENT DOCUMENTS

| | | | |
|---|---|---|---|
| 329,032 | 10/1885 | Falls | 16/76 |
| 754,690 | 3/1904 | Pelzer | 16/50 |
| 926,520 | 6/1909 | Thornton et al. | 16/50 |
| 2,203,197 | 6/1940 | Henry | 16/50 |
| 3,098,258 | 7/1963 | Ruiz | 16/50 |
| 3,380,109 | 4/1968 | Ruiz | 16/50 |
| 3,778,866 | 12/1973 | Nakanishi | 16/76 |
| 3,903,567 | 9/1975 | Suska | 16/189 |
| 4,069,545 | 1/1978 | Holet et al. | 16/72 |
| 5,031,270 | 7/1991 | Lee | 16/50 |

FOREIGN PATENT DOCUMENTS

| | | | |
|---|---|---|---|
| 3313220 | 10/1984 | Germany | 16/75 |
| 1-198983 | 8/1989 | Japan | 16/50 |
| 3-172482 | 7/1991 | Japan | 16/50 |

Primary Examiner—M. Rachuba
Assistant Examiner—Donald M. Gurley
Attorney, Agent, or Firm—Hodgson, Russ, Andrews, Woods & Goodyear, LLP

[57] ABSTRACT

A rotary friction damper in a device for connecting a door to an adjacent structure such that the door pivots about an axis during opening and closing of the same and including a torsion spring operatively connected to the door and to the structure for movement about the pivot axis to store energy during opening of the door and to release energy to provide closing during closing of the door. The rotary friction damper is operatively associated with the torsion spring and has an axis of rotation disposed substantially parallel to the pivot axis for controlling the door closing speed. The rotary friction damper is adjustable and variable. A mechanism operatively associated with the damper varies the resistance of the damper to movement of the torsion spring to produce a controlled uniform closing speed of the door and for reducing the resistance of the damper to movement of the torsion spring when the door nears the closed position to allow the torsion spring to close the door in an unrestricted manner. The mechanism for varying the resistance of the damper is responsive to movement of the torsion spring so that maximum resistance of the damper to movement of the torsion spring occurs when maximum closing power is applied by the torsion spring when the door is fully open, and the resistance of the damper to movement of the torsion spring is reduced as the door closes.

32 Claims, 9 Drawing Sheets

DOOR CLOSER

BACKGROUND OF THE INVENTION

This invention relates to the art of door closers, and more particularly to a new and improved door closer incorporated in a hinge and providing controlled damping and controlled latching during closing of the door.

One area of use of the present invention is with torsion spring door hinges although the principles of the present invention can be variously applied to other door connections such as pivots and hybrids of pivots and hinges. Spring hinges for continuously urging doors to a closed position are well known, and some spring hinges are adjustable to vary the torsional force on the spring and the corresponding force of closure exerted by the spring hinge on the door which it supports. However, torsion spring hinges have not provided a complete solution to the door closing problem. On the one hand, they may in some situations not achieve adequate or complete door closing, and on the other hand in some situations they may cause excessive door closing speed or force so as to be noisy and in some cases damaging the door frame.

Historically, various considerations such as building code compliance, increased security, and conservation of energy expended for heating and air conditioning have required the installation of door closing devices. These devices, typically being provided in addition to hinges, add complexity and expense to door installation, and they often are large and cumbersome thereby detracting from the appearance of the door installation. Furthermore, such door closing devices typically are hydraulic or pneumatic requiring maintenance and repair or replacement.

It would, therefore, be highly desirable to provide a door closer incorporated in a hinge or the like so as to be simple in structure and pleasing in appearance and operating with controlled damping during closing of the door and controlled latching of the door for positive yet quiet closing of the same.

SUMMARY OF THE INVENTION

It is, therefore, a primary object of this invention to provide a new and improved door closer which provides controlled damping during closing of the door.

It is a further object of this invention to provide such a door closer which combines the basic functions of a door closer and a hinge in a single device.

It is a more particular object of this invention to provide such a door closer physically incorporated in a hinge so as to be simple in structure and pleasing in appearance.

It is a further object of this invention to provide such a door closer which provides controlled latching of the door for positive yet quiet closing of the same.

It is a more particular object of this invention to provide such a door closer which is small in size and convenient and economical to install.

It is a further object of this invention to provide a backcheck, i.e. controlled opening speed, of the door to provide a cushioning effect as the door approaches a fully open position.

It is a further object of this invention to provide such a door closer which is efficient and economical in operation requiring nominal maintenance and having a relatively long life.

The present invention provides, in a device for connecting a door to an adjacent structure such that the door pivots about an axis during opening and closing of the same and including spring means operatively connected to the door and to the structure for movement about the pivot axis to store energy during opening of the door and to release energy to provide closing power during closing of the door, rotary friction damper means operatively associated with the spring means and having an axis of rotation disposed substantially parallel to the pivot axis for controlling the door closing speed. The rotary friction damper means is adjustable and variable. In particular, there is also provided means operatively associated with the damper means for varying the resistance of the damper means to movement of the spring means to produce a controlled uniform closing speed of the door and for reducing the resistance of the damper means to movement of the spring means when the door nears the closed position to allow the spring means to close the door in an unrestricted manner, thereby controlling the latching function of the door. The means for varying the resistance of the damper means to movement of the spring means also provides a backcheck, i.e. controlled opening speed, to produce a cushioning effect as the door approaches the fully opened position. Preferably the device is a hinge having a pair of leaves for connection to the door and the adjacent structure and having a barrel between the leaves, the spring means, damper means and resistance varying means being located in the barrel. The means for varying the resistance of the damper means is responsive to movement of the spring means so that maximum resistance of the damper means to movement of the spring means occurs when maximum closing power is applied by the spring means when the door is fully open, and the resistance of the damper means to movement of the spring means is reduced as the door closes. In addition, the door closing speed and door closing power are adjustable.

Accordingly, there is provided a door closer incorporated in a hinge or the like so as to be simple in structure and pleasing in appearance and operating with controlled damping during closing of the door and controlled latching of the door for positive yet quiet closing of the same.

The foregoing and additional advantages and characterizing features of the present invention will become apparent upon a reading of the ensuing detailed description together with the included drawing wherein:

DETAILED DESCRIPTION OF THE ILLUSTRATED EMBODIMENT

The door closer of the present invention preferably is hinge-mounted thereby providing the functions of a traditional door closer in the barrel of the door hinge. The door closer of the present invention combines an adjustable torsion spring which provides the power to close the door, an adjustable, variable rotary friction damper to control the door opening and closing speed, and a cam and lifter mechanism to vary the damping resistance and to control the door latching function. While the door closer of the present invention will be illustrated herein incorporated in a hinge, it is to be understood that it also applicable to other door connections such as pivots and hybrids of pivots and hinges.

Figures 1, 2, 3:
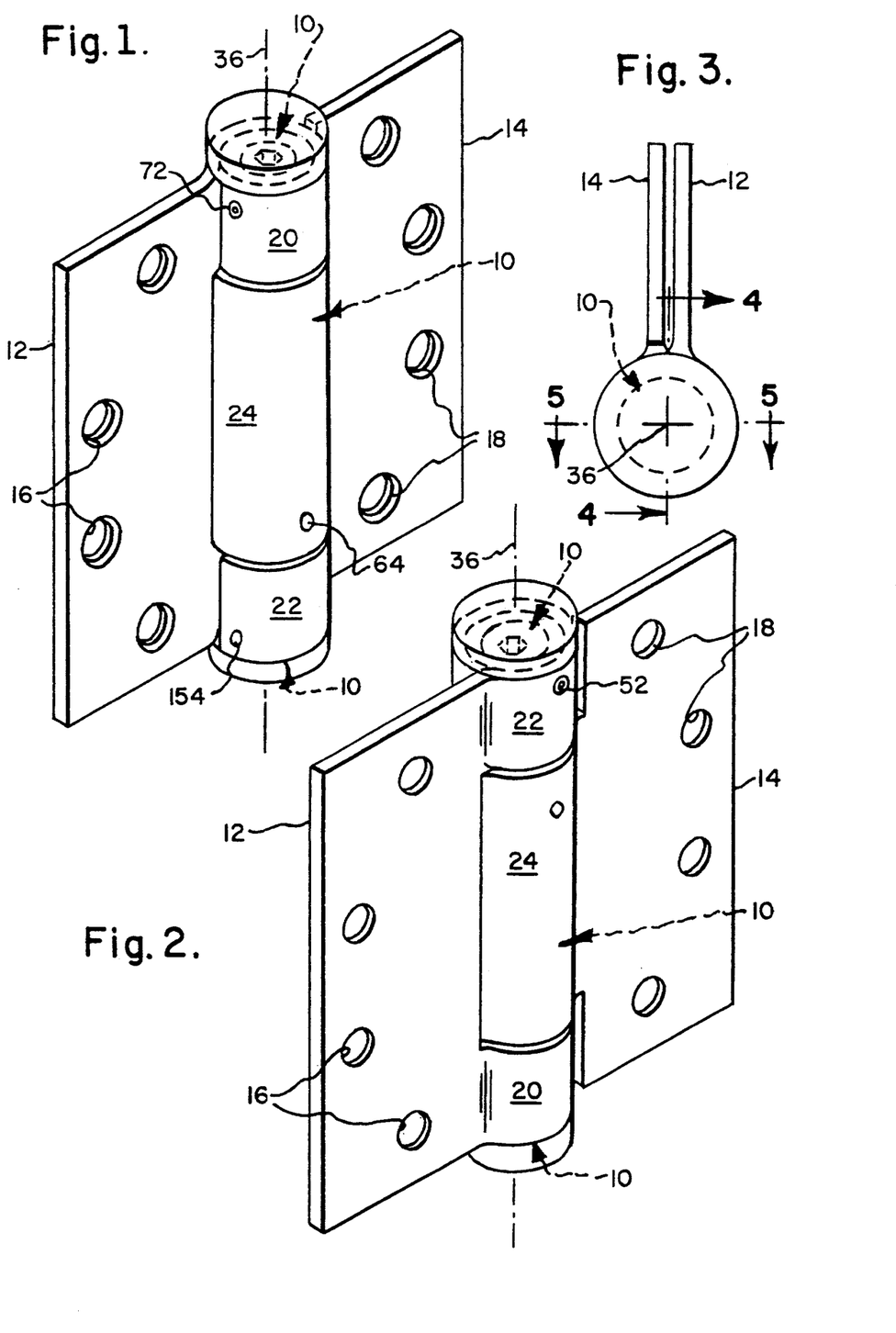
FIG. 1 is a perspective view of a hinge incorporating the door closer of the present invention.
FIG. 2 is a view similar to FIG. 1 rotated 180' about a horizontal axis.
FIG. 3 is a top plan view of the device shown in FIG. 1 with one of the leaves pivoted 180' about the longitudinal axis of the device so that the leaves are in face-to-face relation.

Referring now to FIGS. 1–3, the door closer of the present invention, generally designated 10, is incorporated in a door hinge comprising a pair of rectangular, plate-like leaves 12 and 14 which are adapted for mounting in mortise spaces in a door and frame or like adjacent structure, respectively, in a known manner. Leaves 12 and 14 are provided with countersunk openings 16 and 18, respectively, to receive the heads of screws for such mounting. In the hinge structure shown, leaf 12 is formed to include a pair of spaced-apart outer or end knuckles 20 and 22 and leaf 14 is formed to include a single central knuckle 24 which is located between knuckles 20 and 22 in the assembled arrangement of FIGS. 1 and 2. Knuckles 20,22 and 24 thus co-operate to define a barrel or substantially cylindrical housing in which the door closer 10 of the present invention is located. Thus, the hinge-mounted door closer 10 of the present invention mounts to a door and frame in the same mortise space normally used for a standard door hinge while using the same mounting hardware.

Figure 4:
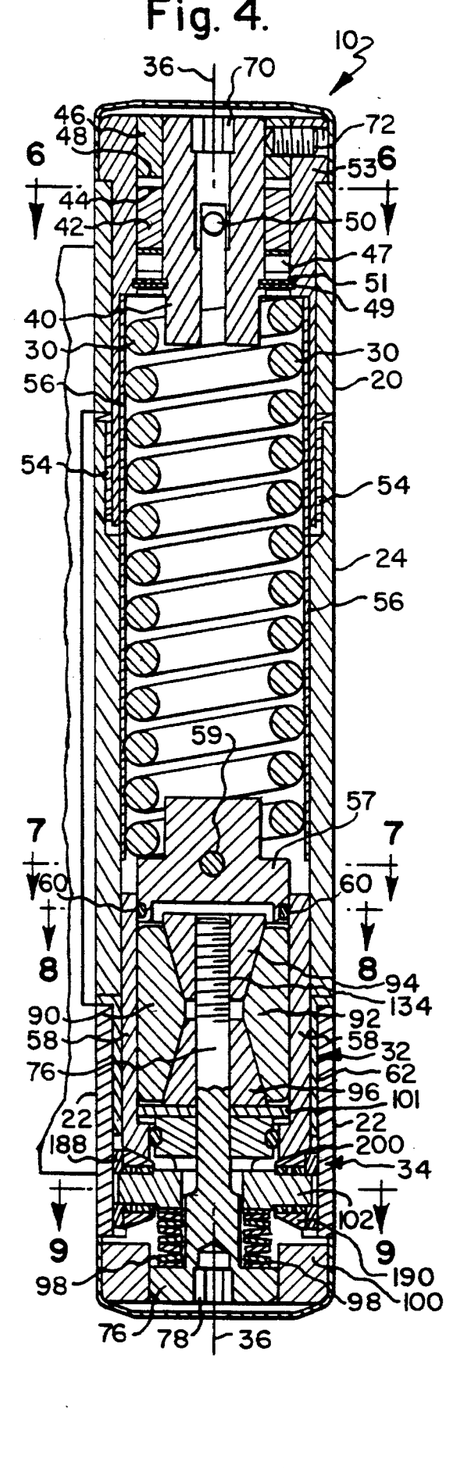
FIG. 4 is a longitudinal sectional view taken about on line 4—4 in FIG. 3.
Figure 5:
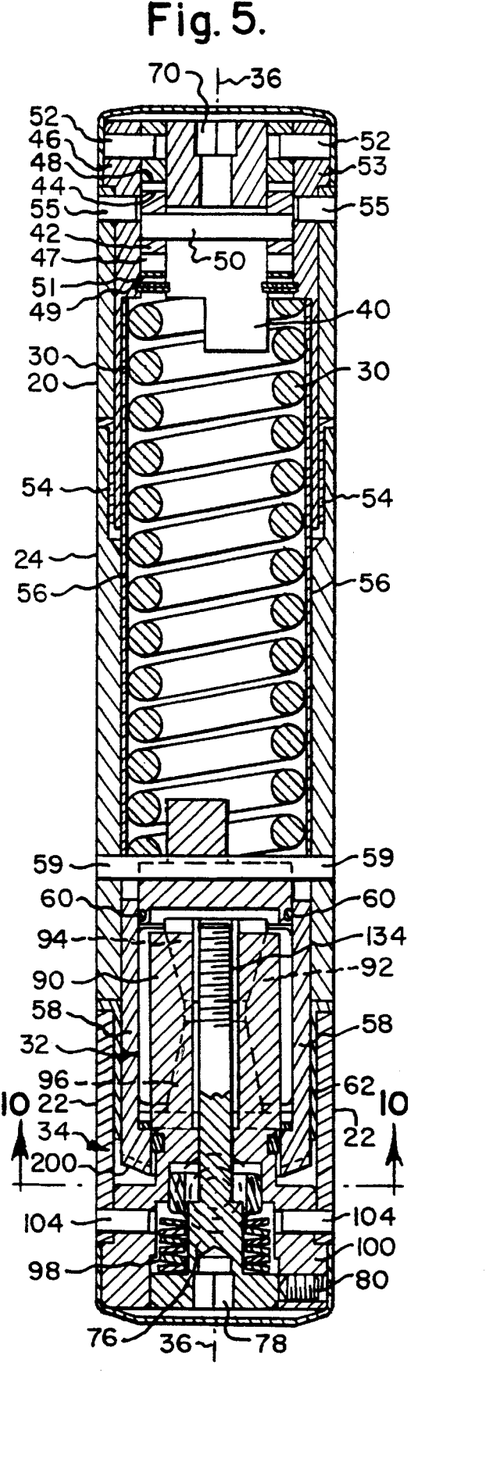
FIG. 5 is a longitudinal sectional view taken about on line 5—5 in FIG. 3.
Figure 6:
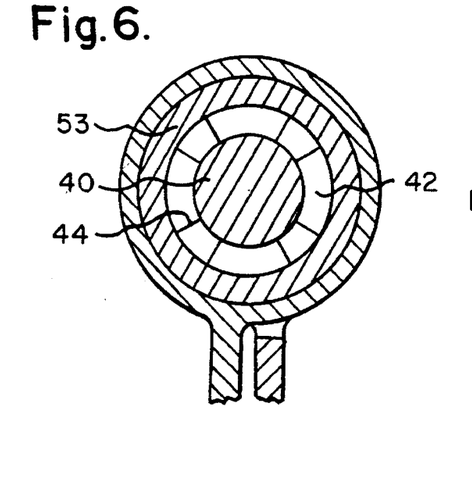
FIG. 6 is a sectional view taken about on line 6—6 in FIG. 4.

Referring now to FIGS. 4 and 5, the door closer 10 of the present invention combines an adjustable torsion spring 30 which provides the power to close the door, an adjustable rotary damper generally designated 32 to control the door closing speed, and a cam and lifter mechanism generally designated 34 to vary the damping resistance and to control the door latching function, all of which will be described in detail presently. A door pivot axis is designated 36 in FIGS. 1–5. One end of torsion spring 30, i.e. the upper end as viewed in FIGS. 4 and 5, is hooked onto an adjustment pin 40 which is received within the combination of a ratchet 42 having teeth 44 on one axial end face thereof and a ratchet retainer 46 having teeth 48 on one axial end face thereof engaging with ratchet teeth 44. The saw-tooth ratchet 44,48 is pre-loaded by means of a wave spring 47. The wave spring 47 utilizes a retaining ring 49 as a stop. The retaining ring 49 is provided to longitudinally fix a spring retainer 51 to a pintle 53. Adjustment pin 40 is rotationally fixed to ratchet 42 by means of a dowel pin 50. Ratchet retainer 46 is rotationally fixed to pintle 53 by means of dowel pins 52. Pintle 53 is rotationally fixed to hinge knuckle 20 by means of dowel pins 55. A flanged sleeve-like bearing 54 is provided in the space between pintle 53 and knuckle 24 and between knuckles 20 and 24 as shown. A sleeve-like liner 56 is provided in the annular space between torsion spring 30 and pintle 53 and between torsion spring 30 and hinge knuckle 24 as shown. The opposite end of torsion spring 30, i.e. the lower end as viewed in FIGS. 4 and 5, is hooked onto a spring retainer 57 which is rotationally fixed to housing 58 and hinge knuckle 24 by means of a dowel pin 59. An O-ring 60 is provided between housing 58 and spring retainer 57. The housing 58 also is operatively coupled to the rotary damper 32 in a manner which will be described. A flanged sleeve-like lower bearing 62 is provided in the space between housing 58 and knuckle 22 and between knuckles 22 and 24 as shown.

After the hinge incorporating door closer 10 is mounted, the closing power is adjusted to accommodate the size and weight of the door. Torsion spring 30 is preloaded by turning adjustment pin 40 with a hex wrench (not shown) inserted in a hexagonal recess 70 in the end surface of adjustment pin 40. As the adjustment pin 40 is turning, the saw-toothed ratchet 44,48 will disengage and engage offering incremental adjustment of torsion spring 30 until the desired closing power is achieved. When the saw-toothed ratchet 44,48 disengages, the wave spring 47 allows the ratchet 42 to move in either direction along the pivot axis 36. A setscrew 72 is provided in pintle 53 and retainer 46 to lock the adjustment pin 40 and prevent inadvertent adjustment or tampering. After proper closing power is achieved and locked, the door closing speed can be adjusted. This adjustment is accomplished by turning an adjustment screw 76 at the opposite end from the spring adjustment with a hex wrench (not shown) inserted in a hexagonal recess 78 in the end surface of adjustment screw 76 clockwise (or counter clockwise) to decrease (or increase) the closing speed of the door. After the proper closing speed is achieved, a setscrew 80 is tightened to lock the adjustment preventing inadvertent adjustment or tampering. Adjustment screw 76 and its relation with components of damper means 32 will be described in further detail presently.

When the door is opened, the torsion spring 30 is wound up which increases the spring closing power. The housing 58 is operatively coupled to the torsion spring 30 and rotary damper 32 and it engages the rotary damper 32 as the door is opening to allow restricted door movement. The combination of increasing spring closing power along with the engaged rotary damper 32 controls the opening speed of the door. The backcheck function, which will be described in further detail presently, is not mechanically adjustable, but is a derivative of the closing power and the closing speed and automatically compensates for their setting when adjusted properly. When the door is released, the torsion spring 30 powers the door closed. The housing 58 continues to engage the rotary damper 32 to resist the closing power of torsion spring 30 and therefore controls the speed of the door. As the door nears the closed position, the cam and lifter mechanism 34 reduces the resistance of the rotary damper 32 to allow the torsion spring to close the door unrestricted over the last portion, i.e. ten degrees, of travel. This ensures that the door will latch, i.e. close, properly. The latching function is not mechanically adjustable, but is a derivative of the closing power and the closing speed and automatically compensates for their settings when adjusted properly. The initiation of the latching function is position sensitive and occurs prior to door latching. The structure and operation of rotary damper 32 and cam and lifter mechanism 34 including the co-operation therebetween to achieve the foregoing will be described in detail presently.

The rotary damper 32 is a friction type damper which relies on the friction between two mating surfaces to create a resistance to movement. The rotary damper 32 utilizes the surface contact between housing 58 and a pair of shoes 90 and 92 shown in detail in FIGS. 12 and 13. The shoes 90 and 92 have an upper and lower tapered internal configuration which matches the tapered external configuration of upper and lower wedges 94 and 96, respectively, shown in further detail in FIGS. 11A and 11B. The upper wedge 94 is threaded to the adjustment screw 76 which "sandwiches" a biasing means in the form of a series of disc springs 98, a stator 100, a thrust bearing 101, the lower wedge 96 and a lifter 102 therebetween. The stator 100 prevents the shoes 90,92, wedges 94,96 and thrust bearing 101 from turning as will be described in detail presently, allowing the housing 58 to rotate around the shoes 90,92. Stator 100 is rotationally fixed to knuckle 22 by means of dowel pins 104. The lifter 102 and its relationship with components of the rotary damper 32 will be described in further detail presently. By adjustably turning the adjustment screw 76 clockwise as previously mentioned, the wedges 94 and 96 are pulled together through the shoes 90,92. The shoes 90,92 will move radially outwardly and contact the housing 58 stopping the displacement of the wedges 94 and 96 and loading the disc springs 98. The loading of the disc springs 98 creates the frictional forces between the housing 58 and shoes 90,92; these forces cause the resistance to movement between them. Conversely, turning the adjustment screw 76 counter-clockwise will decrease the resistance. This rotation of the adjustment screw 76 allows infinite adjustment of the rotary damper 32. Once the resistance is determined, the adjustment screw 76 has no influence on the function of the damper 32. During normal operation, the housing 58 will rotate while the door is opening and will rotate when the door is closing, therefore, resisting the torsion spring power and offering resistance to the opening of the door.

When designing a torsion spring, it is inherent to the design that the winding up of a torsion spring causes the torsional loads to increase and to decrease when un-wound. With this in mind, in accordance with the present invention, the resistance of the rotary damper 32 to the torsion spring 30 varies to produce a uniform door closing speed and smooth operation. The change in resistance is accomplished according to the present invention by changing the load applied by the disc springs 98. This is accomplished by means of the cam and lifter mechanism 34 which compresses the disc springs 98 when the door is opened. Maximum resistance of the damper 32 is achieved the same time maximum closing power is applied by the torsion spring, i.e. when the door is fully opened. This combination of damper resistance and closing power produces the backcheck function, i.e. controlled opening speed, to provide a cushioning effect as the door approaches the fully open position. As the door closes, the lifter component of mechanism 34 is allowed to move away from the disc springs 98 and reduces their load in a manner which will be described. This in turn reduces the resistance of the damper 32. This same cam and lifter mechanism 34 provides the latching function as previously described. As the door nears the closed position the cam configuration is such that the lifter allows the disc springs 98 to completely un-compress, thereby decreasing the resistance of the rotary damper 32 to nearly zero as will be described in detail presently. This allows the torsion spring 30 to provide sufficient force to latch, i.e. close, the door.

Figure 7:
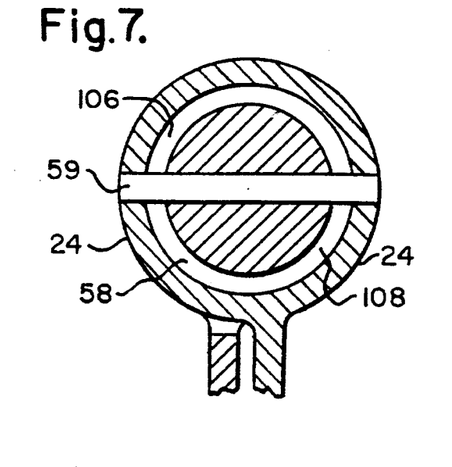
FIG. 7 is a sectional view taken about on line 7—7 in FIG. 4.

Referring now to FIGS. 6–10, FIG. 6 shows in further detail the circumferential arrangement of teeth 44 of ratchet 42 which mesh with teeth 48 of ratchet retainer 46. FIG. 7 illustrates in further detail the relationship between housing 58, dowel pin 59 and hinge knuckle 24. Housing 58 is provided with a pair of generally arcuate recesses 106,108 at diametrically opposite locations to facilitate providing the lateral bore to receive dowel pin 59.

Figure 8:
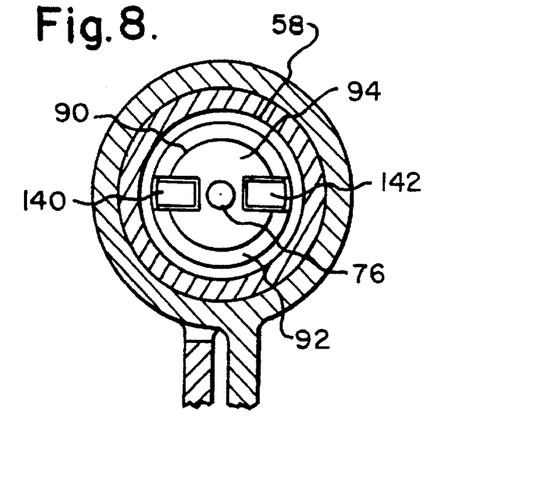
FIG. 8 is a sectional view taken about on line 8—8 in FIG. 4.
Figure 11A:
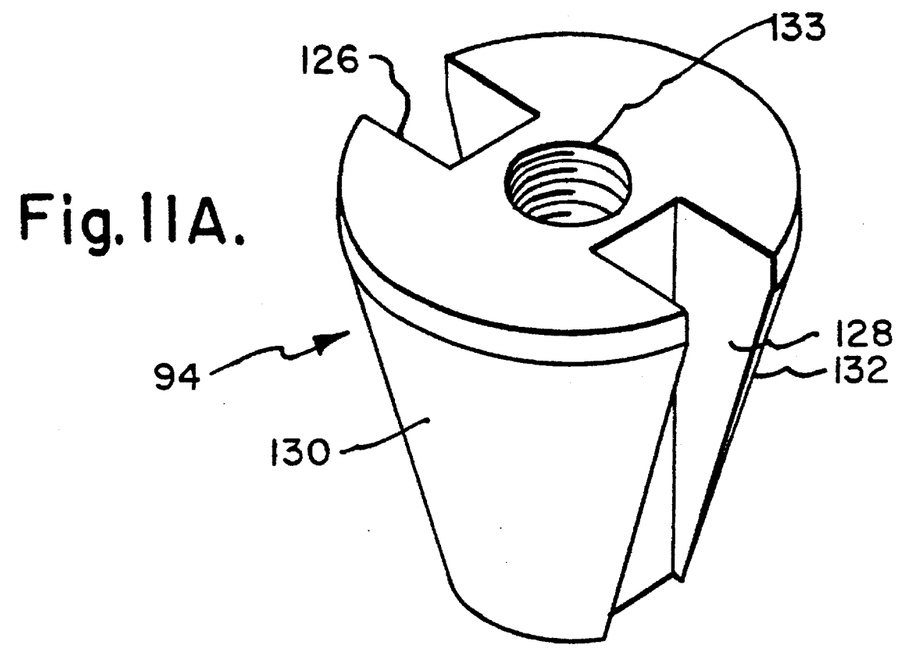
FIG. 11A is a perspective view of one wedge associated with the damping means shown in FIGS. 4 and 5.
Figure 11B:
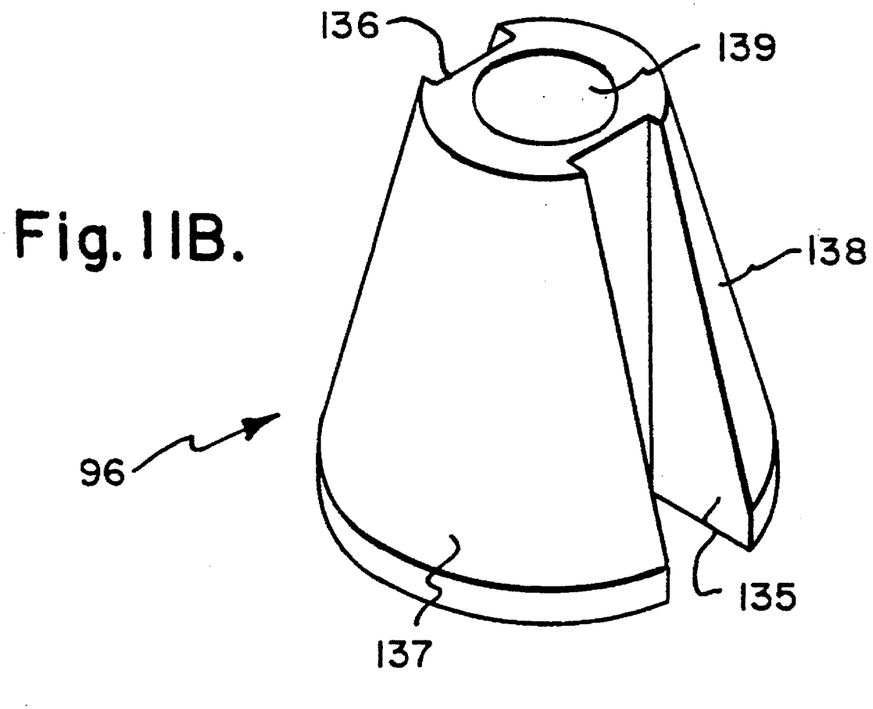
FIG. 11B is a perspective view of the other wedge associated with the damping means shown in FIGS. 4 and 5.
Figures 12, 13, 14:
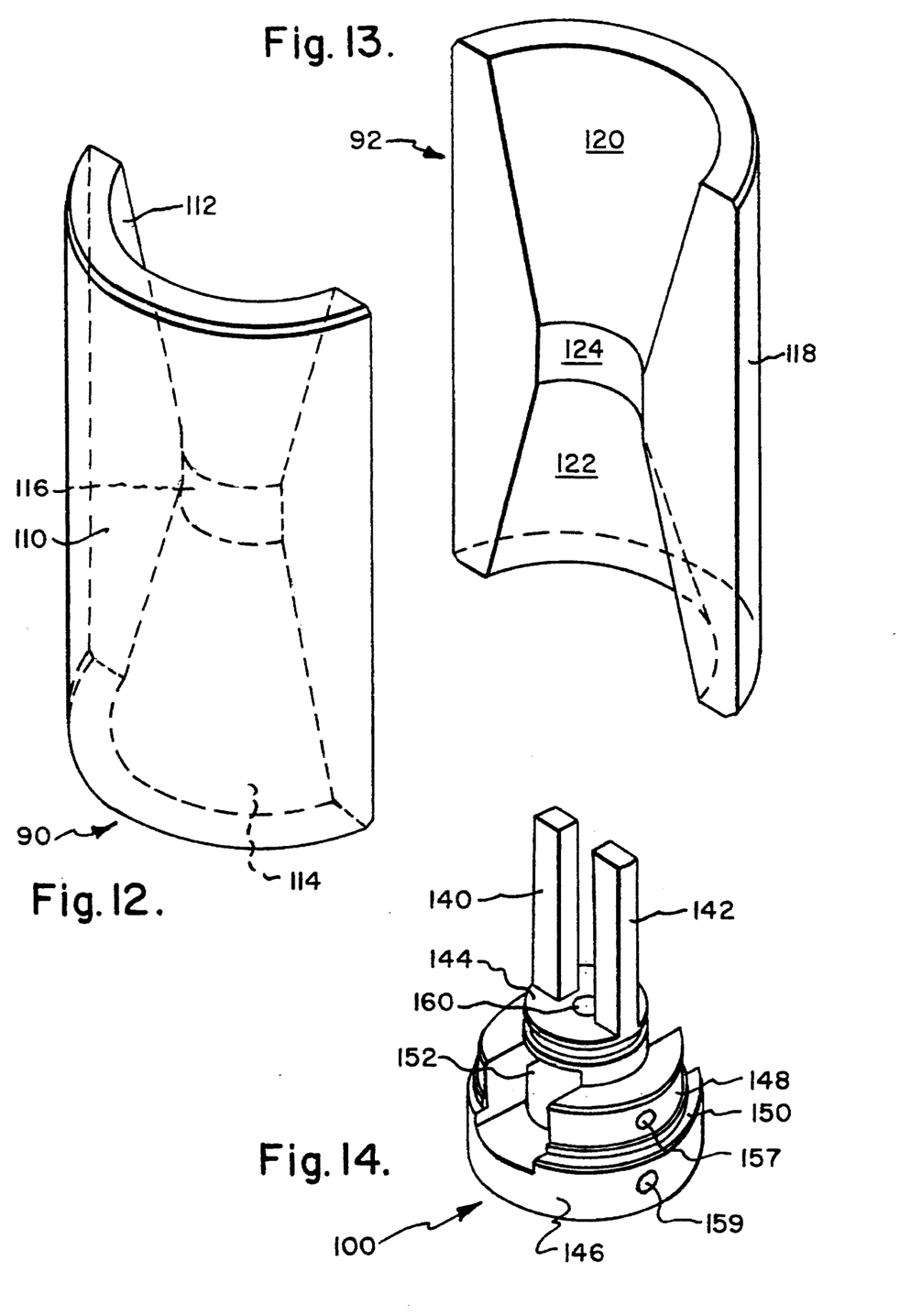
FIG. 12 is a perspective view of one shoe in the damping means shown in FIGS. 4 and 5.
FIG. 13 is a perspective view of the other shoe in the damping means shown in FIGS. 4 and 5.
FIG. 14 is a perspective view of the stator shown in the arrangement of FIGS. 4 and 5.

FIG. 8 shows in further detail the relationship between shoes 90,92, wedge 94, stator 100 and housing 58. In particular, shoe 90 is generally arcuate in shape as shown in FIG. 12 having a generally semi-cylindrical outer surface 110 and first and second inner surfaces 112 and 114 of progressively changing diameter so as to be tapered which surfaces 112, 114 meet a central inner surface 116 of constant diameter. Surfaces 112,114 are of progressively decreasing diameter proceeding axially inwardly from the corresponding opposite ends of shoe 90. Similarly, shoe 92 is generally arcuate in shape as shown in FIG. 13 having a generally semicylindrical outer surface 118 and first and second inner surfaces 120 and 122 of progressively changing diameter so as to be tapered which surfaces 120,122 meet a central inner surface 124 of constant diameter. Surfaces 120,122 are of progressively decreasing diameter proceeding axially inwardly from the corresponding opposite ends of shoe 92. The outer surfaces 110 and 118 of shoes 90 and 92, respectively, operatively contact the inner surface of housing 58 and there is friction therebetween during damping operation of damper means 32. Wedge 94, shown in FIG. 11A, is generally furstoconical in shape having a pair of longitudinally extending slots or keyways 126,128 at diametric opposite locations which divide the outer circumferential surface into oppositely located tapered surface portions 130,132. Surface portions 130 and 132, in turn, operatively contact the inner surfaces 112 and 120, respectively, of shoes 90 and 92 and there is friction therebetween during damping operation of damper means 32. Wedge 94, shown in FIG. 11A, is provided with a threaded longitudinally extending central bore 133 which receives a threaded portion 134 of the shank of adjustment screw 76 as shown in FIGS. 4 and 5. Similarly, wedge 96, shown in FIG. 11B, is generally frustoconical in shape having a pair of longitudinally extending slots or keyways 135,136 at diametric opposite locations which divide the outer circumferential surface into oppositely located tapered surface portions 137,138. Surface portions 137 and 138, in turn, operatively contact the inner surfaces 114 and 122, respectively, of shoes 90 and 92 and there is friction therebetween during damping operation of damper means 32. Wedge 96 is provided with a longitudinally extending central bore 139 which receives a portion of the shank of adjustment screw 76 as shown in FIGS. 4 and 5.

Stator 100, shown in FIG. 14, comprises a generally hollow cylindrical body having a pair of rectangular shaped key members 140 and 142 extending from an axial end face 144 of stator 100 and which fit in the keyways 126 and 128, respectively, of wedge 94 and in the keyways 136 and 135, respectively, of wedge 96. The circumferential outer wall surface of stator 100 includes two portions 146 and 148 of different diameters meeting in an annular step 150. A generally rectangular opening designated 152 in FIG. 14 is provided in the side wall of stator 100 extending through the stator body generally perpendicular to the longitudinal axis thereof. Opening 152 receives the lifter 102 of the cam and lifter mechanism 34 as will be described. Stator 100 is held in place by the pair of dowel pins 104 shown in FIG. 4 which are received in openings in knuckle 22 and in corresponding openings 157 and 158, respectively, in the stator wall. A passage 159 in the stator body accommodates set screw 80. A central opening 160 in end face 144 accommodates the shank of adjustment screw 76.

Figure 9:
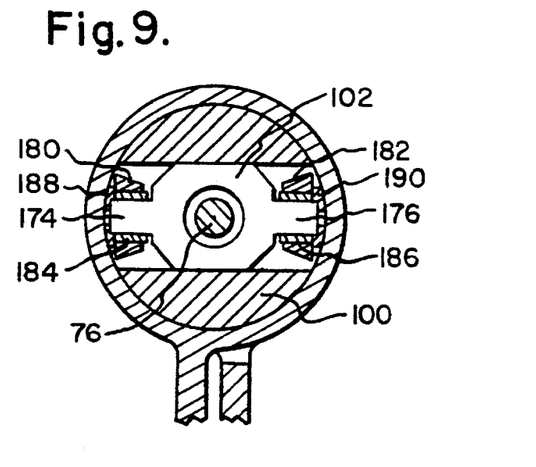
FIG. 9 is a sectional view taken about on line 9—9 in FIG. 4.
Figures 15, 16:
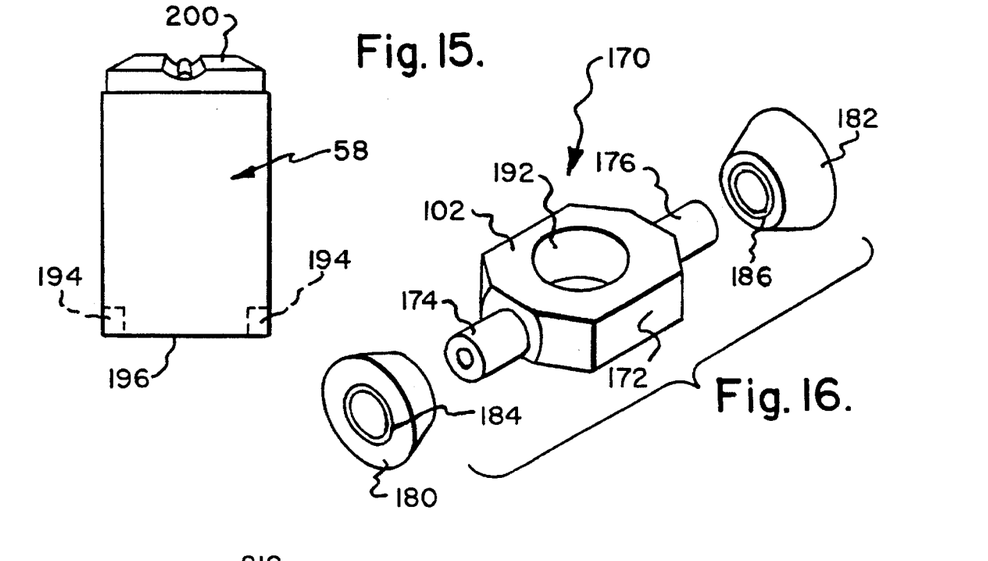
FIG. 15 is a perspective view with a portion removed of the housing shown in the arrangement of FIGS. 4 and 5.
FIG. 16 is a perspective view of the lifter shown in the arrangement of FIGS. 4 and 5.

FIG. 9 shows the relationship between the lifter 102 of the cam and lifter mechanism 34 and stator 100. Lifter 102, also shown in FIG. 16, is generally rectangular in shape including a main body portion 172 which fits within the interior of stator 100. Lifter 170 also includes a pair of radially outwardly extending axles 174 and 176 at diametrically opposite locations for supporting corresponding rollers 180 and 182, respectively. Rollers 180 and 182 have sleeve-like bearings 184 and 186, respectively, provided in the annular space between axles 174,176 and rollers 180,182. A pair of protective caps 188 and 190 are located at each end of the lifter 102 adjacent to hinge knuckle 22. Rollers 180,182 operatively contact the cam surface of the cam and lifter mechanism 34 as will be explained shortly. Lifter 102 is provided with a central opening 192 to accommodate the central body portion of adjustment screw 76.

Figure 10:
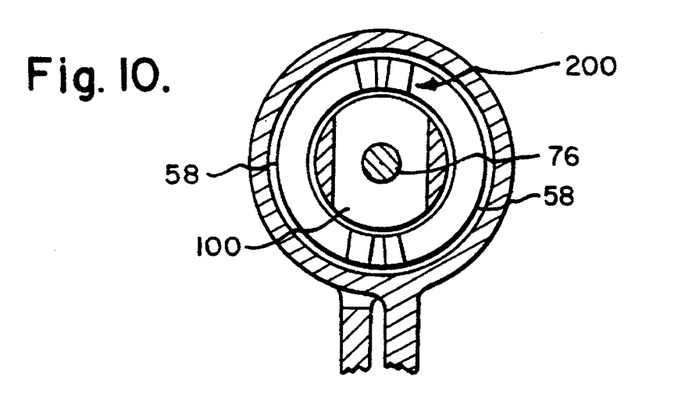
FIG. 10 is a sectional view taken about on line 10—10 in FIG. 5.

FIG. 10 shows the relationship between the housing 58, the cam and lifter mechanism 34, and stator 100. Housing 58, also shown in FIG. 15, is in the form of a cup with the inner surface of the annular wall of housing 58 facing the outer surfaces of shoes 90,92. Housing 58 is provided with a recess 194 extending axially inwardly from an annular end face 196 at one end thereof. Recess 194 receives the pin 59 so that housing 58 is rotated about the longitudinal axis thereof in response to operation of spring 30 during opening and closing of the door. The opposite axial end face of housing 58 defines a cam surface 200 which is contacted by rollers 180,182 and which move along cam surface 200 during opening and closing of the door in a manner which will be described. Cam surface 200 has a profile such that as rollers 180,182 move there along during closing of the door, the resistance of rotary damper 32 to torsion spring 30 is varied to produce a uniform closing speed of the door, and when the door nears the closed position the resistance of damper 32 to torsion spring 30 is reduced to allow torsion spring 30 to close the door in an unrestricted manner. The profile of cam surface 200 which accomplishes the foregoing will be described in detail presently.

As previously described, rotary damper 32 comprises housing 58 and shoes 90,92 with frictional force therebetween being created by loading of disc springs 98 which act as biasing means to urge shoes 90,92 into frictional contact with housing 58. The disc springs 98, in turn, are loaded by the cam and lifter mechanism 34. The biasing force applied by disc springs 98 is in a direction substantially parallel to the axis of rotation of damper 32 and this force is directed by wedges 94,96 in a manner causing radial outward movement of shoes 90,92. Wedges 94,96 are held against rotation relative to shoes 90,92 by engagement of stator keys 140 and 142 which fit into wedge keyways 126,128 and 135,136.

As previously described, rotary damper 32 and the cam and lifter mechanism 34 co-operate to vary the resistance of the damper 32 to movement of torsion spring 30 to produce a uniform closing speed of the door and to reduce the resistance of the damper 32 to movement of spring 30 when the door nears the closed position to allow torsion spring 30 to close the door in an unrestricted manner. In particular, as the door closes, lifter 102 is allowed to move away from springs 98 and reduces their load thereby reducing the resistance of damper 32 to movement of torsion spring 30 to produce a uniform closing speed of the door. As the door nears the closed position, lifter 102 is allowed to let springs 98 nearly completely un-compress thereby decreasing the resistance of damper 32 to nearly zero and allowing torsion spring 30 to provide sufficient force to latch, i.e. close, the door. The foregoing is provided by the profile of cam surface 200 along which lifter 102 moves during closing of the door.

Figure 17:
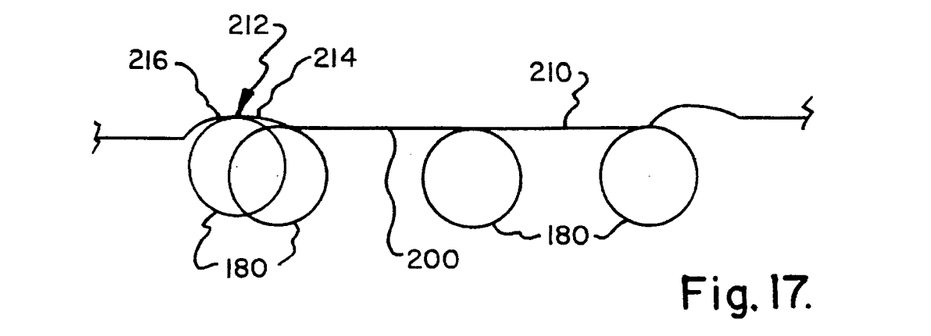
FIG. 17 is a diagrammatic view illustrating operation of the cam and lifter arrangement in the door closer of the present invention.

Referring now to FIG. 17 it is a developed view of cam surface 200 around about one-half the circumference of housing 58 along the end face thereof. An identical cam surface (not shown) is defined around the remaining half of the circumference along the end face of housing 58. Rollers 180,182 travel along diametrically opposite locations on the end face of housing 58. FIG. 17 shows roller 180 at stages of travel along cam surface 200 between fully open and fully closed positions of the door. In particular, the location of roller 180 at the far right position shown in FIG. 17 corresponds to the fully open position of the door. At this location of lifter 102 on cam surface 200, springs 98 are fully compressed. This corresponds to the point at which torsion spring 30 applies maximum closing power, so that it is desirable for damper 32 to apply maximum damping force.

As the door proceeds to close, roller 180 moves along cam surface 200 to the left as viewed in FIG. 17. This portion 210 of cam surface 200 slopes slightly upwardly along the surface toward the left as viewed in FIG. 17, i.e. in a direction away from springs 98, with the result that springs 98 are gradually progressively relaxed as roller 180 moves to the left during closing of the door. Thus, as the door closes, the relaxing of springs 98 gradually reduces the damping force applied by damper 32. Also as the door closes, the closing power provided by torsion spring 30 gradually decreases. As a result, a uniform door closing speed and smooth operation are provided.

When the door nears the closed position, roller 180 enters another portion 214 of cam surface 200 which slopes relatively rapidly upwardly as viewed in FIG. 17. Portion 212 of cam surface 200 is in the form of a notch or recess terminating the cam configuration. In particular, portion 212 includes a ramp-like section 214 leading from portion 210 and extending upwardly as viewed in FIG. 17, i.e. away from springs 98, and at relatively greater slope. Section 214 meets another section 216 disposed substantially horizontally as viewed in FIG. 17 which terminates the cam configuration. Thus, as roller 180 travels along ramp 214 and rests on section 216, springs 98 are nearly completely relaxed. This reduces the damping resistance of damper 32 to nearly zero and allows torsion spring 30 to provide sufficient closing force to latch, i.e close, the door.

The path of travel of roller 180 along cam surface 200 illustrated in FIG. 17 corresponds to movement of the door from a completely open to a completely closed position. This represents a rotational movement about door pivot axis 36 of about 180'. As seen in FIG. 17, when the door reaches the closed position, further movement of roller 180 in a door closing direction, i.e. to the left as viewed in FIG. 17, is limited by the door reaching the fully closed position. As the door is opened and roller 180 moves along cam surface 200 to the right as viewed in FIG. 17, further movement to the right is limited by the door reaching the fully open position. This is indicated by the right-most representation of roller 180 in FIG. 17.

Figure 18:
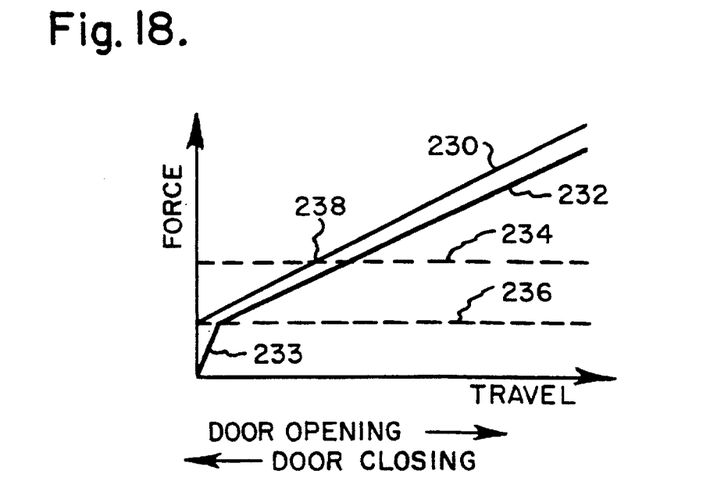
FIG. 18 is a graph including plots illustrating operation of the door closer of the present invention.

Thus, the co-operative relationship between damper 32 and the cam and lifter mechanism 34 varies the resistance of damper 32 to movement of torsion spring 30 between door open and closed positions to produce a uniform closing speed of the door. This is illustrated in FIG. 18 which is a graph representing the spring force of torsion spring 30 and the damping force of damper 32 as it is moved between the open and closed positions. In particular, the vertical axis represents force which increases in the direction of the arrow, and the horizontal axis represents door movement with opening being to the right as viewed in FIG. 18 and closing being to the left. The spring force of torsion spring 30 is represented by line 230 which indicates that the spring force of torsion spring 30 increases linearly as the door is opened, reaching a maximum at the fully open position of the door, and decreases linearly as the door is closed. Line 232 represents the damping force provided by damper 32 which is a maximum when spring force 230 is a maximum and which is varied by the cam and lifter arrangement 34 during opening and closing of the door in accordance with variation in force of torsion spring 30 so as to produce a uniform closing speed of the door. Line 233 represents the damping force provided by damper 32 which decreases to nearly zero as the door nears the closed position and allows the spring force of torsion spring 30 to provide sufficient closing force to latch, i.e. close, the door. This represents a substantial and significant improvement over dampers which provide constant damping force represented by broken lines 234 and 236.

In particular, if the damping force of such dampers is set too high, as indicated by line 234, at point 238 the damping force equals the spring force. This will prevent further closing of the door by the torsion spring because during the remainder of the path of intended door closing, the damping force would exceed the spring force. Accordingly, with such dampers, the damping force must be set at a relatively low level, indicated by the broken line 236, so that the spring force exceeds the damping force during the entire path of travel of the door during closing. However, as indicated in FIG. 18, the difference between spring force 230 and damping force 236 is not uniform during closing of the door thereby resulting in non-uniform closing speed of the door, i.e. initially fast andislow near closed position. In the door closer of the present invention, on the other hand, the difference between spring force 230 and damping force 232 is nearly constant during movement of the door between open and closed positions thereby providing a uniform closing speed of the door and controlled damping during closing of the door.

It is therefore apparent that the present invention accomplishes its intended objects. Door closer 10 of the present invention is incorporated in a hinge or the like so as to be simple in structure and pleasing in appearance and operating with controlled damping during opening and closing of the door and controlled latching of the door for positive yet quiet closing of the same. The present invention combines the basic functions of door closer and hinge in a single unit, and the door closer is small in size, convenient and economical to install, and efficient and economical in operation requiring minimal maintenance and having a relatively long life.

Figures 19, 20:
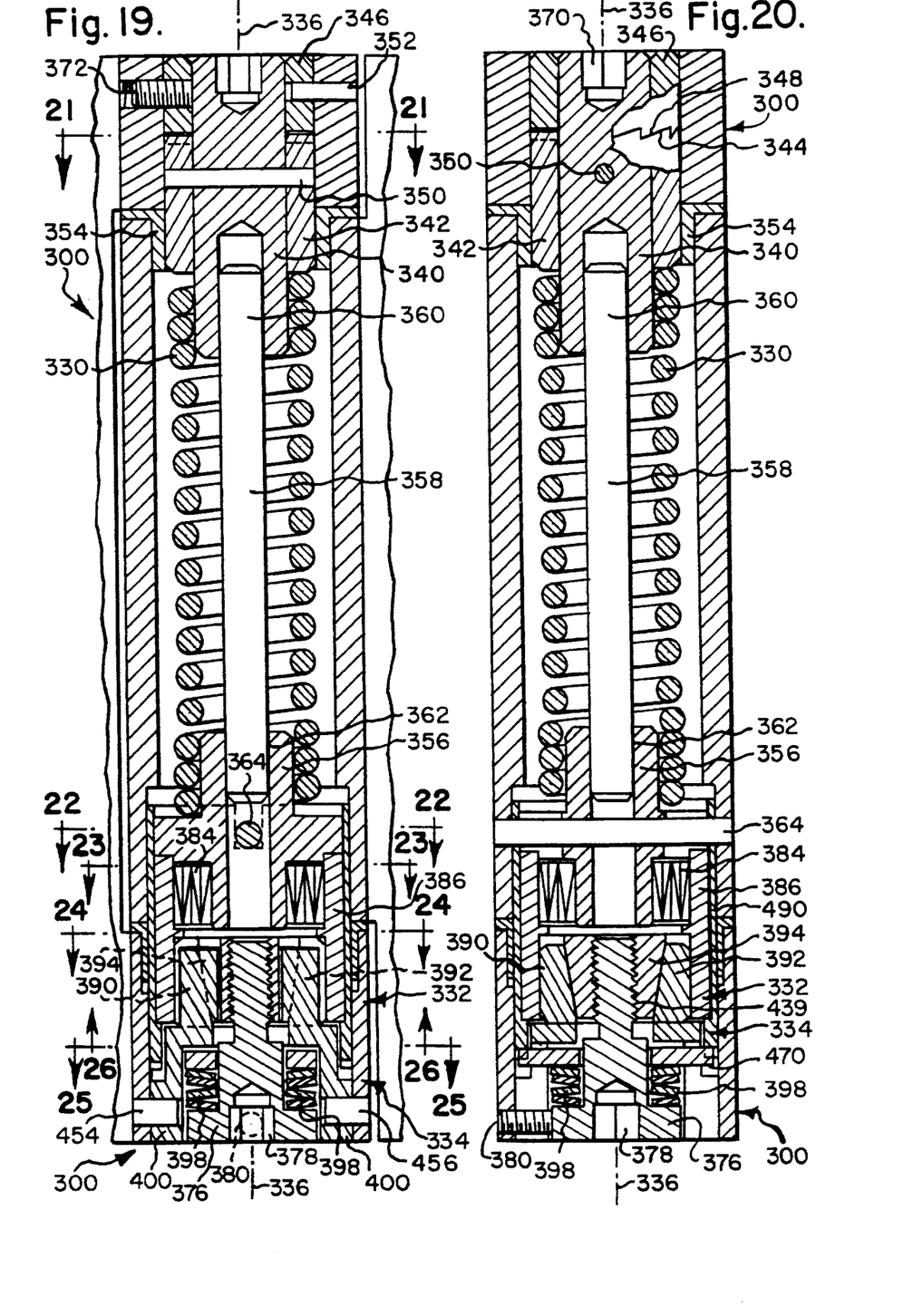
FIG. 19 is a longitudinal sectional view similar to FIG. 4 and illustrating a door closer according to another embodiment of the present invention.
FIG. 20 is a longitudinal sectional view similar to FIG. 5 and further illustrating the door closer of FIG. 19.
Figure 21:
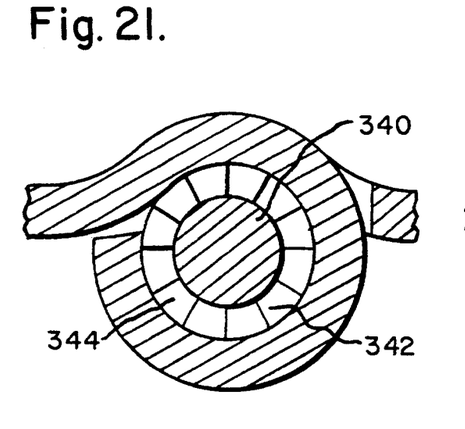
FIG. 21 is a sectional view taken about on line 21—21 in FIG. 19.

FIGS. 19–32 illustrate a door closer 300 according to another embodiment of the present invention. As in the embodiment of FIGS. 1–18, door closer 300 combines an adjustable torsion spring 330 which provides the power to close the door, an adjustable rotary damper generally designated 332 to control the door closing speed, and a cam and lifter mechanism generally designated 334 to vary the damping resistance and to control the door latching function. A door pivot axis is designated 336 in FIGS. 19 and 20. One end of torsion spring 330, i.e. the upper end as viewed in FIGS. 19 and 20, is press-fitted on to an adjustment pin 340 which is received within the combination of a ratchet 342 having teeth 344 on one axial end face thereof and a ratchet retainer 346 having teeth 348 on one axial end face thereof meshing with ratchet teeth 344. Adjustment pin 340 is rotationally fixed to ratchet 342 by means of a dowel pin 350. Ratchet retainer 346 is rotationally fixed to the hinge by means of dowel pin 352. A flanged, sleeve-like bearings 354 is provided in the space between ratchet 342 and the hinge knuckles as shown. The opposite end of torsion spring 330, i.e. the lower end as viewed in FIGS. 19 and 20, is press-fitted onto a spring retainer 356. Adjustment pin 340 and spring retainer 356 are joined by a pin 358, one end of which is press-fitted into a longitudinal bore 360 provided in the end of adjustment pin 340 and the opposite end of which is loose fit into a longitudinal bore 362 provided in the end of spring retainer 356. Spring retainer 356 is rotationally fixed to the hinge knuckle by means of a dowel pin 364. The spring retainer 356 also is operatively coupled to the rotary damper 332 in a manner which will be described.

After the hinge incorporating door closer 300 is mounted, the closing power is adjusted to accommodate the size and weight of the door. As in the embodiment of FIGS. 1–18, torsion spring 330 is preloaded by turning adjustment pin 340 with a hex wrench (not shown) inserted in a hexagonal recess 370 in the end surface of adjustment pin 340. The use of the saw-toothed ratchet 344,348 offers incremental torsion spring adjustment until the desired closing power is achieved. A setscrew 372 is provided in the hinge pintle and through ratchet retainer 346 to lock the adjustment pin 340 and prevent inadvertent adjustment or tampering. After proper closing power is achieved and locked, the door closing speed can be adjusted in a manner similar to that of the embodiment of FIGS. 1–18. This adjustment is accomplished by turning an adjustment screw 376 at the opposite end from the spring adjustment with a hex wrench (not shown) inserted in a hexagonal recess 378 in the end surface of adjustment screw 376 clockwise (or counter clockwise) to decrease (or increase) the closing speed of the door. After the proper closing speed is achieved, a setscrew 380 is provided to lock the adjustment preventing inadvertent adjustment or tampering.

When the door is opened, the torsion spring 330 is wound up which increases the spring closing power. In this embodiment of the present invention, clutch 384 operatively coupling the torsion spring 330 and rotary damper 332 through a sleeve 386 does not engage when the door is opening to allow unrestricted door movement. When the door is released, the torsion spring 330 powers the door closed. The clutch 384 engages the rotary damper 332 to resist the torsion spring closing power and therefore controls the speed of the door. As the door nears the closed position, the cam and lifter mechanism 334 reduces the resistance of the rotary damper 332 to allow the torsion spring to close the door unrestricted over the last portion, i.e. ten degrees, of travel. This ensures that the door will latch, i.e. close, properly. The latching function is not mechanically adjustable, but is a derivative of the close power and the closing speed and automatically compensates for their settings when adjusted properly. The initiation of the latching function is position sensitive and occurs prior to door latching. The structure and operation of rotary damper 332 and cam and lifter mechanism 334 including the co-operation therebetween to achieve the foregoing will be described in detail presently.

The rotary damper 332 is a friction type damper which relies on the friction between two mating surfaces to create a resistance to movement. The rotary damper 332 utilizes the surface contact between sleeve 386 and a pair of shoes 390 and 392 shown in detail in FIGS. 28 and 29. The shoes 390 and 392 have a tapered internal configuration corresponding to the external configuration of wedge 394 a shown in further detail in FIG. 27. The wedge 394 is threaded to the adjustment screw 376 which "sandwiches" a biasing means in the form of a series of disc springs 398, a stator 400 and lifter 470 between them. The stator 400 prevents the shoes 390,392 and wedge 394 from turning as will be described in detail presently, allowing the sleeve 386 to rotate around the shoes 390,392. By adjustably turning the adjustment screw 376 clockwise as previously mentioned, the wedge 394 is pulled through the shoes 390,392. The shoes 390,392 will contact the sleeve 386 stopping the displacement of the wedge 394 and loading the disc springs 398. The loading of the disc springs 398 creates the frictional forces between the sleeve 386 and shoes 390,392; these forces cause the resistance to movement between them. Conversely, turning the adjustment screw 376 counterclockwise will decrease the resistance. This rotation of the adjustment screw 376 allows infinite adjustment of the rotary damper 332. Once the resistance is determined, the adjustment screw 376 has no influence on the function of the damper 332. During normal operation the sleeve 386 will not rotate while the door is opening and will rotate when the door is closing, therefore resisting the torsion spring power.

When designing a torsion spring, it is inherent to the design that the winding up of a torsion spring causes the torsional loads to increase and to decrease when un-wound. With this in mind, in accordance with the present invention, the resistance of the rotary damper 332 to the torsion spring 330 varies to produce a uniform door closing speed and smooth operation. The change in resistance is accomplished according to the present invention by changing the load applied by the disc springs 398. This is accomplished by means of the cam and lifter mechanism 334 which compresses the disc springs 398 when the door is opened. Maximum resistance of the damper 332 is achieved the same time maximum closing power is applied by the torsion spring, i.e. when the door is fully opened. As the door closes, the lifter component of mechanism 334 is allowed to move away from the disc springs 398 and reduces their load in a manner which will be described. This in turn reduces the resistance of the damper 332. This same cam and lifter mechanism 334 provides the latching function as previously described. As the door nears the closed position the cam configuration is such that the lifter allows the disc springs 398 to completely un-compress, thereby decreasing the resistance of the rotary damper 332 to nearly zero as will be described in detail presently. This allows the torsion spring 330 to provide sufficient force to latch, i.e. close, the door.

Figure 22:
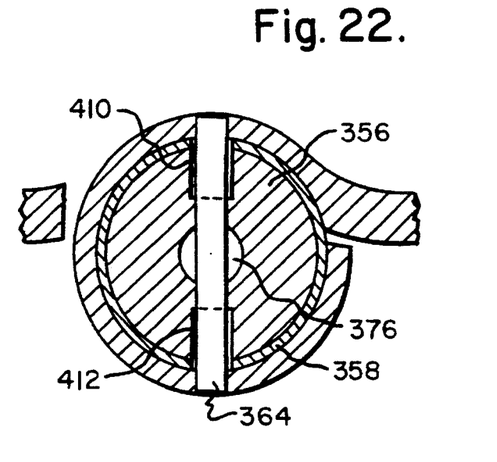
FIG. 22 is a sectional view taken about on line 22—22 in FIG. 19.
Figure 23:
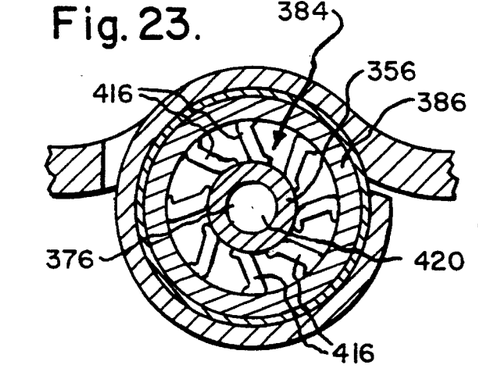
FIG. 23 is a sectional view taken about on line 23—23 in FIG. 19.

Referring now to FIGS. 21–26, FIG. 21 shows in further detail the circumferential arrangement of teeth 344 of ratchet 342 which mesh with teeth 348 of ratchet retainer 346. FIG. 22 illustrates in further detail the relationship between housing 358, dowel pin 364, spring retainer 356 and the hinge knuckle. Spring retainer 356 is provided with a pair of longitudinally extending, radially inwardly extending recesses 410, 412 at diametrically opposite locations providing the lateral bore to receive dowel pin 364. FIG. 23 illustrates the preferred coupling means 384 in the form of a sprag type free-wheeling clutch including a plurality of lever-like sprag elements 416 at spaced locations about a longitudinal axis 420 which is substantially co-incident with the door pivot axis 336. The inner ends of sprags 416 are adapted to engage an annular outer wall portion of spring retainer 356 as shown in FIGS. 19, 20 and 23, and the outer ends of sprags 416 are adapted to engage the inner wall of sleeve 386. During opening of the door when spring 330 and spring retainer 356 rotate in one direction, sprag elements 416 are disengaged and sleeve 386 is stationary. When spring 330 and retainer 356 rotate in the opposite direction, spring elements 416 are engaged to transmit rotational drive to sleeve 386. By way of example, in an illustrative door closer, one form of clutch 384 found to perform satisfactorily is a sprag type free-wheeling clutch commercially available from GMN George Muller Nurnberg GmbH under the designation Series 400.

Figure 24:
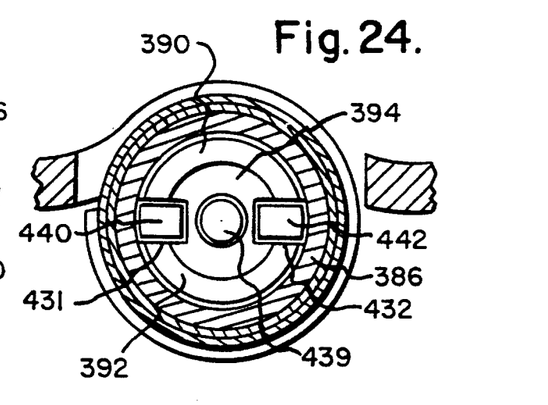
FIG. 24 is a sectional view taken about on line 24–24 in FIG. 19.
Figures 27, 28, 29, 30, 31, 32, 33, 34:
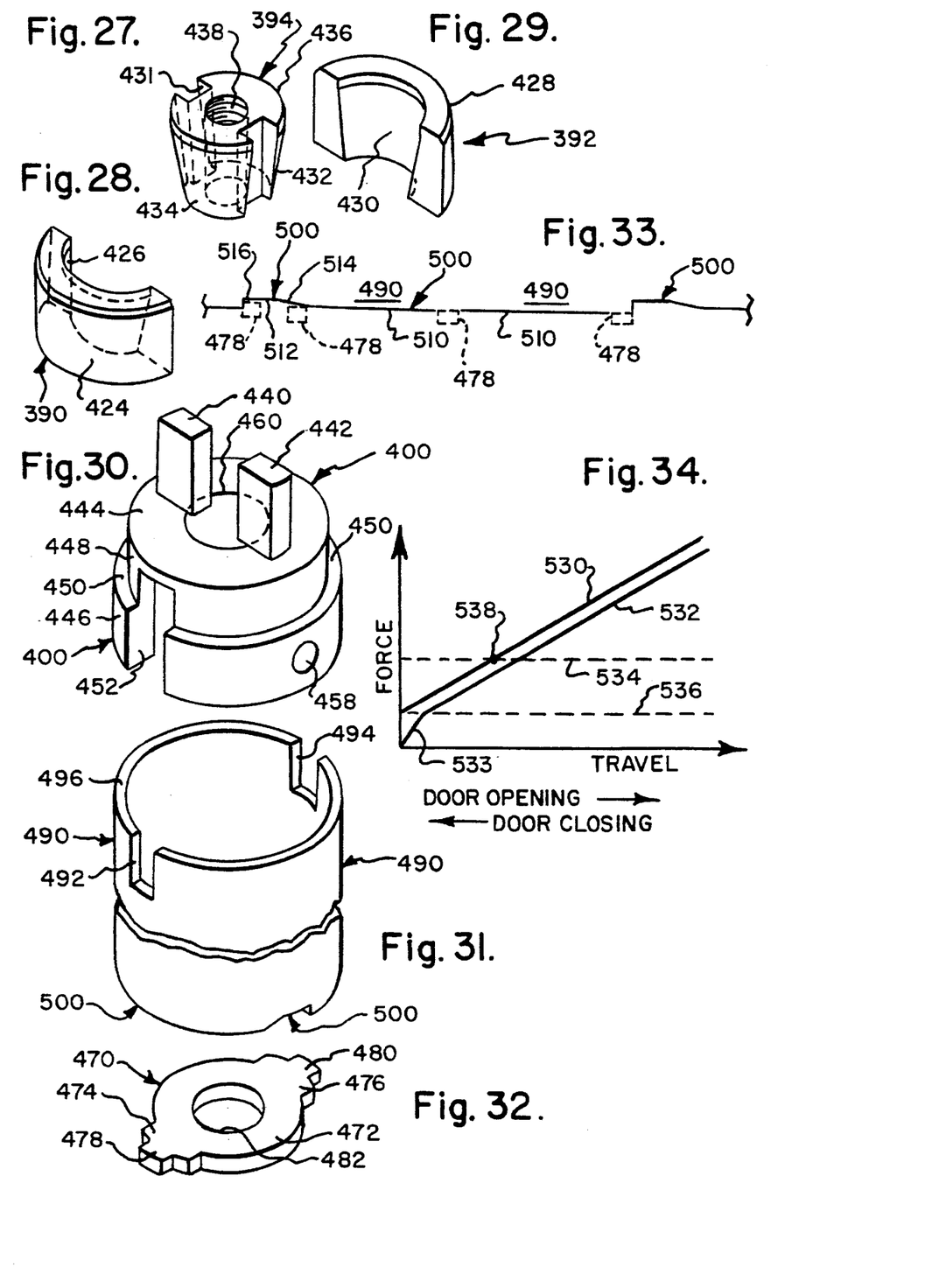
FIG. 27 is a perspective view of the wedge associated with the damping means shown in FIGS. 19 and 20.
FIG. 28 is a perspective view of one of the shoes in the damping means of FIGS. 19 and 20.
FIG. 29 is a perspective view of the other shoe in the damping means of FIGS. 19 and 20.
FIG. 30 is a perspective view of the stator shown in the arrangement of FIGS. 19 and 20.
FIG. 31 is a perspective view with a portion removed of the housing shown in the arrangement of FIGS. 19 and 20.
FIG. 32 is a perspective view of the lifter shown in the arrangement of FIGS. 19 and 20.
FIG. 33 is a diagrammatic view illustrating operation of the cam and lifter arrangement in the door closer of FIGS. 19 and 20.
FIG. 34 is a graph including plots illustrating operation of the door closer of FIGS. 19 and 20.

FIG. 24 shows in further detail the relationship between shoes 390,392, wedge 394, stator 400 and sleeve 386. In particular, shoe 390 is generally arcuate in shape as shown in FIG. 28 having a generally semi-cylindrical outer surface 424 and an inner surface 426 of progressively changing diameter so as to be tapered. Similarly, shoe 392 is generally arcuate in shape as shown in FIG. 29 having a generally semicylindrical outer surface 428 and inner surface 430 of progressively changing diameter so as to be tapered. The outer surfaces 424 and 428 of shoes 390,392 respectively, operatively contact the inner surface of sleeve 386 and there is friction therebetween during damping operation of damper means 332. Wedge 394 is generally furstoconical in shape as shown in FIG. 27 having a pair of longitudinally extending slots or keyways 431,432 at diametric opposite locations which divide the outer circumferential surface into oppositely located tapered surface portions 434,436. Surface portions 434 and 436, in turn, operatively contact the inner surfaces 426 and 430, respectively, of shoes 390 and 392 and there is friction therebetween during damping operation of damper means 332. Wedge 394 is provided with a threaded longitudinally extending central bore 438 which receives a threaded shank 439 of adjustment screw 376 as shown in FIGS. 19 and 20.

Stator 400, shown in FIG. 30, comprises a generally hollow cylindrical body having a pair of rectangular shaped key members 440 and 442 extending from an axial end face 444 of stator 400 and which fit in the keyways 431 and 432, respectively, of wedge 394. The circumferential outer wall surface of stator 400 includes two portions 446 and 448 of different diameters meeting in an annular step 450. A generally rectangular opening designated 452 in FIG. 30 is provided in the side wall of stator 400 passing through perpendicular to the central axis to receive the lifter of the cam and lifter mechanism 334 as will be described. Stator 400 is held in place by a pair of dowel pins 454,456 shown in FIG. 19 which are received in openings in the hinge knuckle and in corresponding openings in the stator wall, one of which is designated 458 in FIG. 30. A central opening 460 in end face 444 accommodates the shank 439 of adjustment screw 376.

Figure 25:
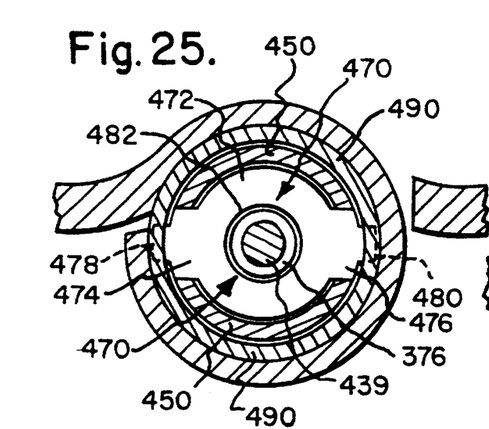
FIG. 25 is a sectional view taken about on line 25–25 in FIG. 19.

FIG. 25 shows the relationship between the lifter 470 of the cam and lifter mechanism 334 and stator 400. Lifter 470, also shown in FIG. 32, is generally disc-shaped including a main body portion 472 which fits within the interior of stator 400. Lifter 470 also includes a pair of radially outward extensions 474 and 476 at diametrically opposite locations which terminate in ears 478 and 480, respectively. Ears 478,480 operatively contact the cam surface of the cam and lifter mechanisms 334 as will be explained shortly. Lifter 470 is provided with a central opening 482 to accommodate the central body portion of adjustment screw 376.

Figure 26:
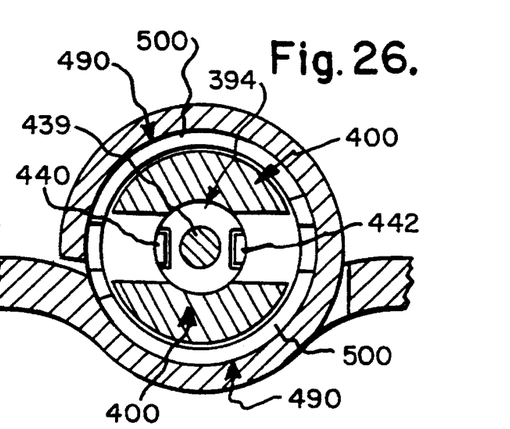
FIG. 26 is a sectional view taken about on line 26—26 in FIG. 19.

FIG. 26 shows the relationship between the housing 490 of the cam and lifter mechanism 334 and stator 400. Housing 490, also shown in FIG. 31, is in the form of a sleeve which surrounds sleeve 380 (not shown in FIG. 26) with the inner surface of housing 490 facing the outer surface of sleeve 380. Housing 490 is provided with a pair of diametrically opposed recesses 492, 494 extending axially inwardly from annular end face 496 at one end thereof. Recesses 492, 494 receive the ends of pin 364 so that the housing 490 is rotated about the longitudinal axis thereof in response to rotation of the spring retainer 356 caused by operation of torsion spring 330 during opening and closing of the door. The opposite axial end face of housing 490 defines a cam surface 500 which is contacted by lifter ears 478,480 and which moves along cam surface 500 during opening and closing of the door in a manner which will be described. Cam surface 500 has a profile such that as lifter 470 moves therealong during closing of the door, the resistance of rotary damper 332 to torsion spring 330 is varied to produce a uniform closing speed of the door, and when the door nears the closed position the resistance of damper 332 to torsion spring 330 is reduced to allow torsion spring 330 to close the door in an unrestricted manner. The profile of cam surface 500 which accomplishes the foregoing will be described in detail presently.

As previously described, rotary damper 332 comprises sleeve 386 and shoes 390,392 with frictional force therebetween being created by loading of disc springs 398 which act as biasing means to urge shoes 390,392 into frictional contact with sleeve 386. The disc springs 398, in turn, are loaded by the cam and lifter mechanism 334. The biasing force applied by disc springs 398 is in a direction substantially parallel to the axis of rotation of damper 332 and this force is directed by wedge 394 in a manner causing radial outward movement of shoes 390,392. Wedge 394 is held against rotation relative to shoes 390,392 by engagement of stator keys 440 and 442 which fit into wedge keyways 431,432.

In the embodiment of the door closer 300 thus described, the provision of clutch 384 results in free, undamped movement of the door during opening thereof and damped movement of the door during closing thereof. As previously described, rotary damper 332 and the cam and lifter mechanism 334 co-operate to vary the resistance of the damper 332 to movement of torsion spring 330 to produce a uniform closing speed of the door and to reduce the resistance of the damper 332 to movement of torsion spring 330 when the door nears the closed position to allow torsion spring 330 to close the door in an unrestricted manner. In particular, as the door closes, lifter 470 is allowed to move away from springs 398 and reduces their load thereby reducing the resistance of damper 332 to movement of torsion spring 330 to produce a uniform closing speed of the door. As the door nears the closed position, lifter 470 is allowed to let springs 398 completely un-compress thereby decreasing the resistance of damper 332 to nearly zero and allowing torsion spring 330 to provide sufficient force to latch, i.e. close, the door. The foregoing is provided by the profile of cam surface 500 along which lifter 470 moves during closing of the door.

Referring now to FIG. 33 it is a developed view of cam surface 500 around about one-half the circumference of the housing 490. An identical cam surface (not shown) is defined around the remaining half of the circumference of housing 490. Lifter ears 478,480 travel along diametrically opposite locations on the end face of cam housing 490. FIG. 33 shows lifter ear 478 at stages of travel along cam surface 500 between fully open and fully closed positions of the door. In particular, the location of ear 478 at the far right position shown in FIG. 33 corresponds to the fully open position of the door. At this location of lifter 470 on cam surface 500, springs 398 are fully compressed. This corresponds to the point at which torsion spring 330 applies maximum closing power, so that it is desirable for damper 332 to apply maximum damping force.

As the door proceeds to close, ear 478 moves along cam surface 500 to the left as viewed in FIG. 33. This portion 510 of cam surface 500 slopes slightly upwardly along the surface toward the left as viewed in FIG. 33, i.e. in a direction away from springs 398, with the result that springs 398 are gradually progressively relaxed as ear 478 moves to the left during closing of the door. Thus, as the door closes, the relaxing of springs 398 gradually reduces the damping force applied by damper 332. Also as the door closes, the closing power provided by torsion spring 330 gradually decreases. As a result, a uniform door closing speed and smooth operation are provided.

When the door nears the closed position, lifter ear 478 enters another portion 514 of cam surface 500 which slopes relatively rapidly upwardly as viewed in FIG. 33. Portion 512 of cam surface 500 is in the form of a notch or recess terminating the cam configuration. In particular, portion 512 includes a ramp-like section 514 leading from portion 510 and extending upwardly as viewed in FIG. 33, i.e. away from springs 398, and at relatively greater slope. Section 514 meets another section 516 disposed substantially horizontally as viewed in FIG. 33 which terminates the cam configuration. Thus, as lifter ear 478 travels along ramp 514 and rests on section 516, springs 398 are nearly completely relaxed. This reduces the damping resistance of damper 332 to nearly zero and allows torsion spring 330 to provide sufficient closing force to latch, i.e close, the door.

The path of travel of lifter ear 478 along cam surface 500 illustrated in FIG. 33 corresponds to movement of the door from a completely open to a completely closed position. This represents a rotational movement about door pivot axis 336 of about 180'. As seen in FIG. 33, when the door reaches the closed position, further movement of lifter ear 478 in a door closing direction, i.e. to the left as viewed in FIG. 33, is limited by the door reading the fully closed position. As the door is opened and lifter ear 478 moves along cam surface 500 to the right as viewed in FIG. 33, further movement to the right is limited by the door reaching the fully open position. This is indicated by the right-most representation of lifter ear 478 in FIG. 33.

Thus, the co-operative relationship between damper 332 and the cam and lifter mechanism 334 varies the resistance of damper 332 to movement of torsion spring 330 between door open and closed positions to produce a uniform closing speed of the door. This is illustrated in FIG. 34 which is a graph representing the spring force of torsion spring 330 and the damping force of damper 332 as is moved between the open and closed positions. In particular, the vertical axis represents force which increases in the direction of the arrow, and the horizontal axis represents door movement with opening being to the right as viewed in FIG. 34 and closing being to the left. The spring force of torsion spring 330 is represented by line 530 which indicates that the spring force of torsion spring 330 increases linearly as the door is opened, reaching a maximum at the fully open position of the door, and decreases linearly as the door is closed. Line 532 represents the damping force provided by damper 332 which is a maximum when spring force 530 is a maximum and which is varied by the cam and lifter arrangement 334 during opening and closing of the door in accordance with variation in force of torsion spring 330 so as to produce a uniform closing speed of the door. Line 533 represents the damping force provided by damper 332 which decreases to nearly zero as the door nears the closed position and allows the spring force of torsion spring 330 to provide sufficient closing force to latch, i.e. close, the door. This represents a substantial and significant improvement over dampers which provide constant damping force represented by broken lines 534 and 536.

In particular, if the damping force of such dampers is set too high, as indicated by line 534, at point 538 the damping force equals the spring force. This will prevent further closing of the door by the torsion spring because during the remainder of the path of intended door closing, the damping force would exceed the spring force. Accordingly, with such dampers, the damping force must be set at a relatively low level, indicated by the broken line 536, so that the spring force exceeds the damping force during the entire path of travel of the door during closing. However, as indicated in FIG. 34, the difference between spring force 530 and damping force 530 and damping force 536 is not uniform during closing of the door thereby resulting in non-uniform closing speed of the door, i.e. initially fast and slow near closed position. In the door closer of the present invention, on the other hand, the difference between torsion spring force 530 and damping force 532 is constant during movement of the door between open and closed positions thereby providing a uniform closing speed of the door and controlled damping during closing of the door.

While embodiments of the present invention have been described in detail, that is for the purpose of illustration, not limitation.

What is claimed is:

1. In a device for connecting a door to an adjacent structure such that the door pivots about an axis during opening and closing of the same and including spring means operatively connected to said door and to said structure for movement about said pivot axis to store energy during opening of said door and to release energy to provide closing power during closing of the door:

a) rotary friction damper means operatively coupled to said spring means and having an axis of rotation disposed substantially parallel to said pivot axis for controlling the door closing speed;

b) means operatively coupled to said damper means to vary the resistance of said damper means to movement of said spring means to produce a uniform closing speed of said door, said means to vary the resistance of said damper means being responsive to movement of said spring means so that maximum resistance of said damper means to movement of said spring means occurs when maximum closing power is applied by said spring means when said door is fully open and the resistance of said damper means to movement of said spring means is reduced as said door closes, the combination of damper resistance and door closing power producing a backcheck function to provide controlled door opening speed and a cushioning effect as the door approaches a fully opened position; and c) means operatively coupled to said damper means for reducing the resistance of said damper means to movement of said spring means when said door nears the closing position to allow said spring means to close said door in an unrestricted manner.

2. Apparatus according to claim 1, wherein said device comprises a hinge having a pair of leaves for connection to said door and to said structure and a barrel between said leaves, said spring means and said damper means being located in said barrel.

3. Apparatus according to claim 1, further including coupling means operatively connected to said spring means and to said damper means for providing free, undamped movement of said door during opening thereof and for providing damped movement of said door during closing thereof.

4. Apparatus according to claim 1, further including adjustment means operatively connected to said damper means for adjusting the door closing speed.

5. Apparatus according to claim 4, wherein said adjustment means comprises means for adjusting the resistance of said damper means to movement of said spring means.

6. Apparatus according to claim 4, further including locking means operatively engaging said adjustment means for locking said adjustment means once an adjustment has been made.

7. Apparatus according to claim 1 further including adjustment means operatively connected to said spring means for adjusting the door closing power provided by said spring means.

8. Apparatus according to claim 7 further including locking means operatively engaging said adjustment means for locking said adjustment means once an adjustment has been made.

9. Apparatus according to claim 1, wherein said rotary friction damper means comprises:

a) means defining damping surfaces in frictional contact; and b) biasing means for urging said damping surface defining means into frictional contact.

10. Apparatus according to claim 9, further including means for varying the force applied by said biasing means to said damping surface as a function of the rotational position of said door.

11. Apparatus according to claim 9, further including means for reducing the resistance of said damper means to movement of said spring means when said door nears the closed position to allow said spring means to close said door in an unrestricted manner.

12. In a hinge for connecting a door to an adjacent structure such that the door pivots about an axis during opening and closing of the same including a pair of leaves for connection to said door and to said structure and a barrel therebetween and spring means in said barrel operatively connected to said leaves for movement about said pivot axis to store energy during opening of said door and to release energy to provide closing power during closing of the door:

a) rotary friction damper means in said barrel operatively coupled to said spring means and having an axis of rotation disposed substantially parallel to said pivot axis for controlling the door closing speed;

b) means in said barrel operatively coupled to said damper means for varying the resistance of said damper means to movement of said spring means to produce a uniform closing speed of said door and for reducing the resistance of said damper means to movement of said spring means when said door nears the closed position to allow said spring means to close said door in an unrestricted manner; and c) said rotary friction damper means comprising means defining damping surfaces in frictional contact and biasing means for urging said damping surface defining means into frictional contact, and said means operatively coupled to said damper means comprising means for defining a cam surface having a profile shaped to vary the force applied by said biasing means to said damping surfaces, cam element means operatively contacting said cam surface and operatively coupled to said biasing means, and means for causing relative movement between said cam surface and said cam element means in response to movement of said spring means.

13. Apparatus according to claim 12, further including coupling means operatively connected to said spring means and to said damper means for providing free, undamped movement of said door during opening thereof and for providing damped movement of said door during closing thereof.

14. Apparatus according to claim 12, further including adjustment means operatively connected to said damper means for adjusting the door closing speed.

15. Apparatus according to claim 14, wherein said adjustment means comprises means for adjusting the resistance of said damper means to movement of said spring means.

16. Apparatus according to claim 14, further including locking means operatively engaging said adjustment means for locking said adjustment means once an adjustment has been made.

17. Apparatus according to claim 12, wherein said means for varying the resistance of said damper means is responsive to movement of said spring means so that maximum resistance of said damper means to movement of said spring means occurs when maximum closing power is applied to said spring means when said door is fully open and the resistance of said damper means to movement of said spring means is reduced as said door closes.

18. Apparatus according to claim 17, wherein the combination of damper resistance and door closing power produces a backcheck function to provide controlled door opening speed and a cushioning effect as the door approaches a fully opened position.

19. Apparatus according to claim 12, further including adjustment means operatively connected to said spring means for adjusting the door closing power provided by said spring means.

20. Apparatus according to claim 19, further including locking means operatively engaging said adjustment means for locking said adjustment means once an adjustment has been made.

21. Apparatus according to claim 12, wherein said rotary friction damper means comprises:

a) means defining damping surfaces in frictional contact; and b) biasing means for urging said damping surface defining means into frictional contact.

22. Apparatus according to claim 21, wherein said damping surface defining means comprises:

a) housing means having a longitudinal axis coincident with said axis of rotation of said damper means and supported for rotation by said spring means during closing of said door;

b) shoe means within said housing means and supported for radial outward movement into frictional contact with said housing means.

23. Apparatus according to claim 22, further including clutch means operatively coupled to said spring means and to said housing means for decoupling said spring means and said housing means during opening of said door to provide free, undamped movement thereof and for coupling said spring means and said housing means during closing of said door to provide damped movement thereof.

24. Apparatus according to claim 22, wherein said biasing means comprises disc spring means for applying biasing force in a direction substantially parallel to the axis of rotation of said damper means and further including means operatively coupled to said disc spring means and said shoe means for directing the biasing force in a manner causing said radial outward movement of said shoe means.

25. Apparatus according to claim 12, wherein said cam surface is shaped so that maximum resistance of said damper means to movement of said spring means occurs when maximum closing power is applied by said spring means when said door is fully open and the resistance of said damper means to movement of said spring means is reduced as said door closes.

26. Apparatus according to claim 12, wherein said cam surface is shaped to reduce the resistance of said damper means to movement of said spring means when said door nears the closed position to allow said spring means to close the door in a unrestricted manner.

27. In a device for connecting a door to an adjacent structure such that the door pivots about an axis during opening and closing of the same and including spring means operatively connected to said door and to said structure for movement about said pivot axis to store energy during opening of said door and to release energy to provide closing power during closing of the door:

rotary friction damper means operatively coupled to said spring means and having an axis of rotation disposed substantially parallel to said pivot axis for controlling the door closing speed, said rotary friction damper means comprising means defining damping surfaces in frictional contact and biasing means for urging said damping surface defining means into frictional contact, said damping surface defining means comprising housing means having a longitudinal axis coincident with said axis of rotation of said damper means and supported for rotation by said spring means during closing of said door and shoe means within said housing means and supported for radial outward movement into frictional contact with said housing means.

28. In a device for connecting a door to an adjacent structure such that the door pivots about an axis during opening and closing of the same and including spring means operatively connected to said door and to said structure for movement about said pivot axis to store energy during opening of said door and to release energy to provide closing power during closing of the door:

rotary friction damper means operatively coupled to said spring means and having an axis of rotation disposed substantially parallel to said pivot axis for controlling the door closing speed, said rotary friction damper means comprising means defining damping surfaces in frictional contact and biasing means for urging said damping surface defining means into frictional contact, said damping surface defining means comprising housing means having a longitudinal axis coincident with said axis of rotation of said damper means and supported for rotation by said spring means during closing of said door and shoe means within said housing means and supported for radial outward movement into frictional contact with said housing means, and further including clutch means operatively coupled to said spring means and to said housing means for decoupling said spring means and said housing means during opening of said door to provide free, undamped movement thereof and for coupling said spring means and said housing means during closing of said door to provide damped movement thereof.

29. In a device for connecting a door to an adjacent structure such that the door pivots about an axis during opening and closing of the same and including spring means operatively connected to said door and to said structure for movement about said pivot axis to store energy during opening of said door and to release energy to provide closing power during closing of the door:

rotary friction damper means operatively coupled to said spring means and having an axis of rotation disposed substantially parallel to said pivot axis for controlling the door closing speed, said rotary friction damper means comprising means defining damping surfaces in frictional contact and biasing means for urging said damping surface defining means into frictional contact, said damping surface defining means comprising housing means having a longitudinal axis coincident with said axis of rotation of said damper means and supported for rotation by said spring means during closing of said door and shoe means within said housing means and supported for radial outward movement into frictional contact with said housing means, said biasing means comprising disc spring means for applying biasing force in a direction substantially parallel to the axis of rotation of said damper means, and further including means operatively coupled to said disc spring means and said shoe means for directing the biasing force in a manner causing said radial outward movement of said shoe means.

30. In a device for connecting a door to an adjacent structure such that the door pivots about an axis during opening and closing of the same and including spring means operatively connected to said door and to said structure for movement about said pivot axis to store energy during opening of said door and to release energy to provide closing power during closing of the door:

rotary friction damper means operatively coupled to said spring means and having an axis of rotation disposed substantially parallel to said pivot axis for controlling the door closing speed, said rotary friction damper means comprising means defining damping surfaces in frictional contact and biasing means for urging said damping surface defining means into frictional contact, and further including means for varying the force applied by said biasing means to said damping surface as a function of the rotational position of said door comprising means for defining a cam surface having a profile shaped to vary the force applied by said biasing means to said damping surfaces, cam element means operatively contacting said cam surface and operatively coupled to said biasing means, and means for causing relative movement between said cam surface and said cam element means in response to movement of said spring means.

31. Apparatus according to claim 30, wherein said cam surface is shaped so that maximum resistance of said damper means to movement of said spring means occurs when maximum closing power is applied by said spring means when said door is fully open and the resistance of said damper means to movement of said spring means is reduced as said door closes.

32. In a device for connecting a door to an adjacent structure such that the door pivots about an axis during opening and closing of the same and including spring means operatively connected to said door and to said structure for movement about said pivot axis to store energy during opening of said door and to release energy to provide closing power during closing of the door:

rotary friction damper means operatively coupled to said spring means and having an axis of rotation disposed substantially parallel to said pivot axis for controlling the door closing speed, said rotary friction damper means comprising means defining damping surfaces in frictional contact and biasing means for urging said damping surface defining means into frictional contact, and further including means for reducing the resistance of said damper means to movement of said spring means when said door nears the closed position to allow said spring means to close said door in an unrestricted manner, said means for reducing the resistance of said damper means comprising means for defining a cam surface having a profile shaped to reduce the resistance of said damper means to movement of said spring means when said door nears the closed position to allow said spring means to close said door in an unrestricted manner, cam element means operatively contacting said cam surface and operatively coupled to said biasing means, and means for causing relative movement between said cam surface and said cam element means in response to movement of said spring means.

* * * * *